(12) United States Patent
Maurer et al.

(10) Patent No.: US 9,714,602 B2
(45) Date of Patent: Jul. 25, 2017

(54) AIRFLOW DIRECTING MEMBER FOR A VEHICLE ENGINE COMPARTMENT

(75) Inventors: Michael W. Maurer, Dublin, OH (US); Michael R. Missig, Powell, OH (US); Jason A. Widmer, Marysville, OH (US); Sukwon Kim, Camp Hill, PA (US); Karl Forster, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1012 days.

(21) Appl. No.: 13/422,022

(22) Filed: Mar. 16, 2012

(65) Prior Publication Data

US 2013/0244562 A1   Sep. 19, 2013

(51) Int. Cl.
*B60H 1/34*  (2006.01)
*F01P 11/10*  (2006.01)
*B60K 11/08*  (2006.01)

(52) U.S. Cl.
CPC ............... *F01P 11/10* (2013.01); *B60K 11/08* (2013.01)

(58) Field of Classification Search
CPC ........... B60K 11/08; B60K 11/04; F01P 11/10
See application file for complete search history.

(56) References Cited

U.S. PATENT DOCUMENTS

| 2,160,980 | A | * | 6/1939 | Morton | F01P 3/18 165/122 |
|---|---|---|---|---|---|
| 2,991,109 | A | | 7/1961 | Milner | |
| 4,169,501 | A | * | 10/1979 | Takeuchi | B60K 11/04 123/41.49 |
| 4,646,863 | A | * | 3/1987 | Yamada | 180/68.1 |
| 4,706,615 | A | | 11/1987 | Scadding | |
| 4,938,303 | A | | 7/1990 | Shaal et al. | |
| 5,066,057 | A | * | 11/1991 | Furuta | B60R 19/18 293/121 |
| 5,219,016 | A | * | 6/1993 | Bolton et al. | 165/41 |
| 6,405,819 | B1 | * | 6/2002 | Ohkura et al. | 180/68.1 |
| 6,540,275 | B1 | * | 4/2003 | Iwamoto | B60R 19/12 293/109 |

(Continued)

FOREIGN PATENT DOCUMENTS

| DE | 19611934 C1 * | 4/1997 | ............ B60R 19/04 |
|---|---|---|---|
| DE | 102005051659 B3 * | 8/2007 | |

(Continued)

OTHER PUBLICATIONS

Murata, et al, JP 09189227 A English machine translation, Jul. 1997.*

(Continued)

*Primary Examiner* — Alissa Tompkins
*Assistant Examiner* — Phillip E Decker
(74) *Attorney, Agent, or Firm* — Rankin, Hill & Clark LLP

(57) ABSTRACT

A vehicle engine compartment airflow directing member for use with an airflow introducing and directing system includes a base portion and a bottom breather airflow directing portion. The base portion is configured to be secured to support rods provided in the vehicle engine compartment and to enclose a space disposed immediately rearward of the vehicle bumper beam. The bottom breather airflow directing portion extends from the base portion and narrows a bottom breather airflow path within the vehicle engine compartment while also preventing bottom breather airflow from recirculating to a position underneath the vehicle bumper beam.

16 Claims, 8 Drawing Sheets

(56) References Cited

U.S. PATENT DOCUMENTS

| | | | | |
|---|---|---|---|---|
| 6,676,179 B2 * | 1/2004 | Sato et al. | | 293/115 |
| 6,789,606 B2 * | 9/2004 | Ohki | | B60K 11/04 180/68.1 |
| 7,013,951 B2 * | 3/2006 | Bauer | | B60K 11/08 180/68.4 |
| 7,114,587 B2 * | 10/2006 | Mori | | B60K 11/04 180/68.3 |
| 7,410,018 B2 * | 8/2008 | Satou | | 180/68.4 |
| 7,451,844 B2 * | 11/2008 | Kunikata | | B60K 11/04 180/68.1 |
| 7,717,494 B2 * | 5/2010 | Nagahama | | B62D 37/02 296/180.1 |
| 7,726,428 B2 * | 6/2010 | Kowalski | | B62D 25/084 180/68.4 |
| 7,766,111 B2 * | 8/2010 | Guilfoyle | | B60K 11/085 180/68.1 |
| 8,287,036 B2 * | 10/2012 | Nakaura et al. | | 296/203.02 |
| 8,434,579 B2 * | 5/2013 | Widmer | | B62D 25/084 180/68.1 |
| 8,763,738 B2 * | 7/2014 | Missig | | B62D 35/02 180/68.1 |
| 8,939,243 B2 * | 1/2015 | Ito | | B60R 19/18 180/68.1 |
| 8,998,293 B2 * | 4/2015 | Glickman | | B60K 11/08 180/68.1 |
| 9,333,849 B2 * | 5/2016 | Kabbes | | B60K 11/08 |
| 2010/0147611 A1 * | 6/2010 | Amano | | B60K 11/085 180/68.1 |
| 2010/0243352 A1 * | 9/2010 | Watanabe | | B60K 11/085 180/68.1 |
| 2010/0282533 A1 | 11/2010 | Sugiyama | | |
| 2011/0017535 A1 * | 1/2011 | Salvesen | | B60K 13/02 180/68.3 |
| 2011/0097984 A1 * | 4/2011 | Hasegawa | | B60K 11/085 454/152 |
| 2011/0181075 A1 * | 7/2011 | Glickman | | B60K 11/08 296/193.09 |
| 2012/0043051 A1 * | 2/2012 | Kurokawa et al. | | 165/41 |
| 2012/0248824 A1 * | 10/2012 | Fujiu | | B60K 11/08 296/208 |
| 2013/0200655 A1 * | 8/2013 | Missig et al. | | 296/193.09 |
| 2013/0221707 A1 * | 8/2013 | Huttenlocher | | 296/193.1 |

FOREIGN PATENT DOCUMENTS

| | | | | |
|---|---|---|---|---|
| EP | 0535406 | | 4/1993 | |
| EP | 652150 A1 * | | 5/1995 | B62D 25/08 |
| FR | 2853722 A1 * | | 10/2004 | |
| FR | 2906191 A1 * | | 3/2008 | B60K 13/02 |
| JP | 5847624 | | 3/1983 | |
| JP | 02109728 A * | | 4/1990 | |
| JP | 09189227 A * | | 7/1997 | F01P 11/12 |
| JP | 2010089523 | | 4/2010 | |
| JP | 2010214998 A * | | 9/2010 | |
| JP | 2012-210894 A * | | 11/2012 | |
| JP | 2012-210895 A * | | 11/2012 | |

OTHER PUBLICATIONS

Morbach, et al., DE19611934 C1 English machine translation, Apr. 17, 1997.*

Maeda, et al., JP58-047624 A English machine translation, Mar. 19, 1983.*

* cited by examiner (COMPARATIVE EXAMPLE)
(PRIOR ART)

AIRFLOW DIRECTING MEMBER FOR A VEHICLE ENGINE COMPARTMENT

BACKGROUND

The present disclosure generally relates to an airflow directing member for a vehicle engine compartment, and more particularly relates to an airflow directing member for a vehicle engine compartment which is secured to a member between a vehicle bumper beam and a vehicle radiator.

During operation, certain vehicle components, such as an engine of the vehicle, may generate heat and need to be cooled. Conventionally, the vehicle engine is cooled using a vehicle radiator. To provide airflow to the radiator, the vehicle may be equipped with ram airflow openings which allow for ram airflow to enter the vehicle engine compartment and direct airflow to the radiator.

The use of ram airflow takes advantage of the vehicle's motion during driving to facilitate cooling of the vehicle engine components. In this regard, the vehicle ram airflow openings may be positioned on the vehicle to receive an airflow directed toward and impacting the vehicle while the vehicle is in motion (the ram airflow), and may introduce the ram airflow into the vehicle engine compartment. The ram airflow may be directed at a relatively high rate of speed proportional to a speed of movement of the vehicle, and can facilitate cooling of the vehicle engine components due to the cooling effect of the relatively high-speed airflow.

However, the vehicle engine compartment may not be configured or arranged to fully take advantage of the ram airflow cooling effect due to a lack of an optimized aerodynamic and/or airflow directing design within the vehicle engine compartment. Particularly, the vehicle engine compartment may include areas or regions along one or more ram airflow paths which may be susceptible to becoming low pressure areas or regions. These low pressure areas or regions may allow or encourage ram airflow to leak from the ram airflow path or to recirculate within the vehicle engine compartment, thereby reducing the efficiency of cooling by the introduced ram airflow. Moreover, even if some manner of ram airflow direction is provided in the vehicle engine compartment, the mechanism for ram airflow direction may not be optimally positioned or configured to reduce or eliminate the problematic low pressure areas or regions.

SUMMARY

According to one aspect, an airflow directing member is provided for a vehicle engine compartment having a vehicle bumper beam disposed at a forward end thereof , support rods disposed rearwardly from the vehicle bumper beam, and airflow introducing ports including a bottom breather opening for introducing a bottom breather airflow into a bottom breather airflow path in the vehicle engine compartment. The airflow directing member comprises a base portion and a bottom breather airflow directing portion. The base portion is configured to be secured to the support rods and to extend between the support rods and the vehicle bumper beam. The bottom breather airflow directing portion extends from the base portion such that the bottom breather airflow path within the vehicle engine compartment is narrowed by the bottom breather airflow directing portion when the base portion of the airflow directing member is secured to the support rods.

According to another aspect, a vehicle engine compartment is provided with a vehicle bumper beam disposed at a forward end thereof, a vehicle radiator held therein at a position relatively rearward from the vehicle bumper beam, and support rods disposed between the vehicle bumper beam and the vehicle radiator. The vehicle engine compartment comprises a bottom breather opening and an airflow directing member. The bottom breather opening is defined through a lower surface of the vehicle and is formed to allow a bottom breather airflow to be introduced into the vehicle engine compartment, with a bottom breather airflow path defined from the bottom breather opening to the vehicle radiator. The airflow directing member has a base portion and a bottom breather airflow directing portion. The base portion is secured to the support rods and extends between the vehicle bumper beam and the support rods. The bottom breather airflow directing portion extends from the base portion toward the bottom breather opening to a position obstructing recirculation of bottom breather airflow to a position disposed underneath the vehicle bumper beam.

According to still another aspect, a vehicle engine compartment airflow introducing and directing system is provided for directing airflow to a vehicle radiator housed in a vehicle engine compartment. The vehicle engine compartment has a vehicle bumper beam disposed at a forward end thereof, and support rods disposed between the vehicle bumper beam and the vehicle radiator. The airflow introducing and directing system comprises a front fascia opening, a bottom breather opening, and an airflow directing member. The front fascia opening is defined through a front fascia at a position above the vehicle bumper beam, the front fascia defining a forward end of the vehicle engine compartment. The bottom breather opening is formed on an underside of the vehicle engine compartment. The airflow directing member is secured to the support rods, has a base portion positioned to direct a front airflow entering the vehicle engine compartment through the front fascia opening to the vehicle radiator, and a bottom breather airflow directing portion extending from the base portion toward the underside of the vehicle to a position which reduces recirculation within the vehicle engine compartment of bottom breather airflow entering from the bottom breather opening.

DETAILED DESCRIPTION

Figure 1:
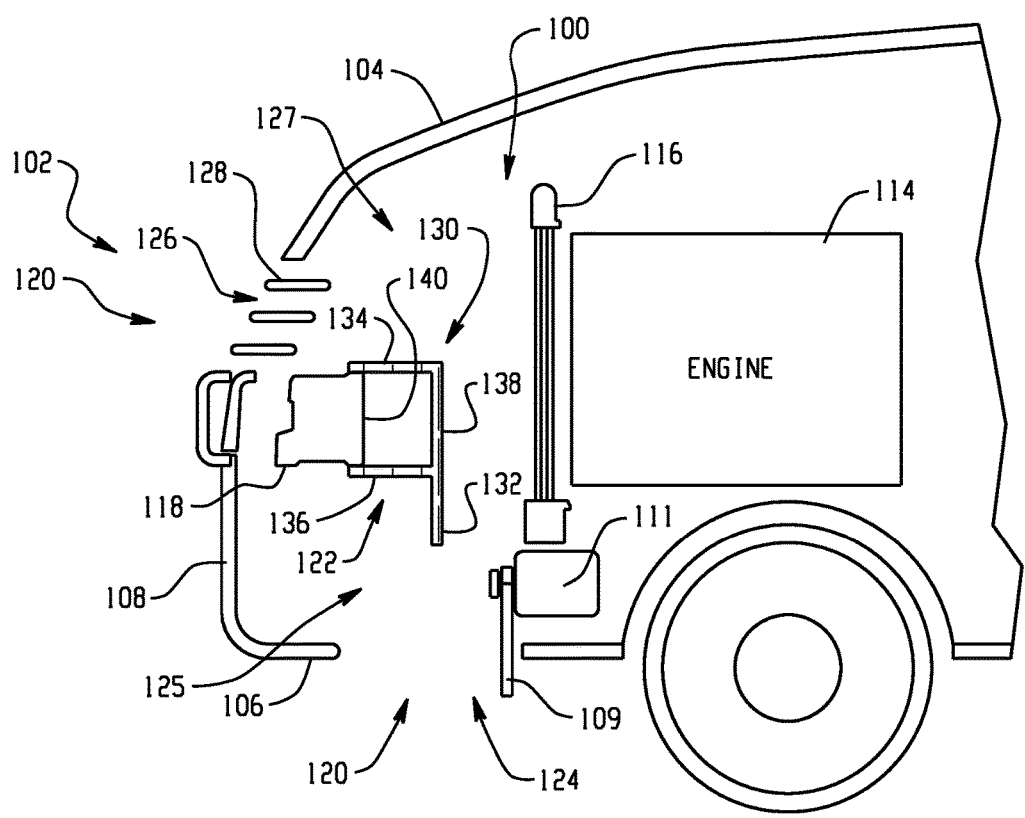
FIG. 1 is a side-sectional view of a vehicle engine compartment having an airflow directing member.

The description and drawings herein are merely illustrative and various modifications and changes can be made in the structures disclosed without departing from what is defined in the appended claims. All references to direction and position, unless otherwise indicated, refer to the orientation of the structures and components illustrated in the drawings and should not be construed as limiting the claims appended hereto. Like numbers refer to like parts throughout the several views.

Figure 2:
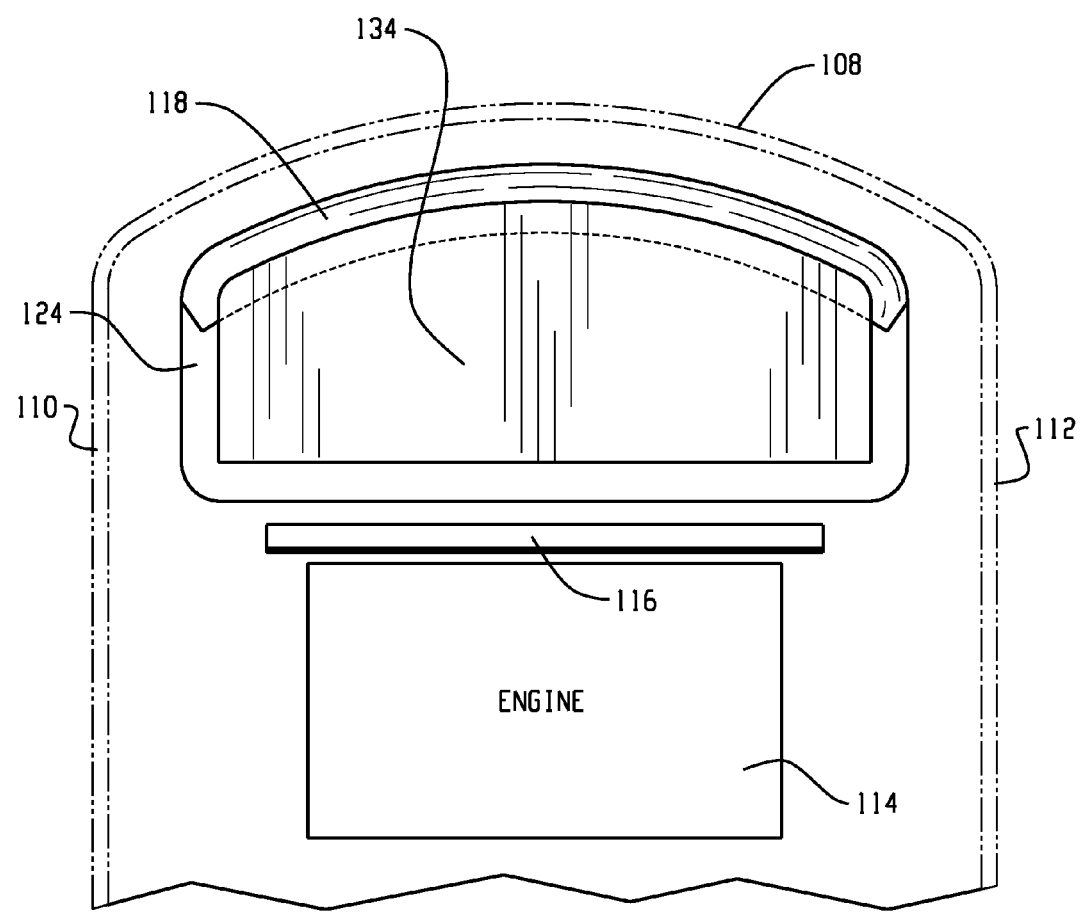
FIG. 2 is a plan view of the vehicle engine compartment having the airflow directing member illustrated in FIG. 1.

FIGS. 1 and 2 illustrate a vehicle engine compartment 100 provided with an airflow introducing and directing system 102. The vehicle engine compartment 100 defines a substantially enclosed area which, as illustrated, is bounded at an upper end by a vehicle engine compartment upper surface 104, at a forward end by a vehicle engine compartment forward surface 108, at a first or left side by a first or left side surface 110 and at a second or right side by a second or right side surface 112. It is noted that the upper surface 104 may be a vehicle engine compartment closing member, such as a vehicle hood or bonnet, the forward surface 108 may be a front fascia, and the left and right side surfaces 110, 112 may be vehicle fenders.

A lower end of a vehicle engine compartment 100 (i.e., a vehicle engine compartment underside) may be fully opened, or may be partially or fully enclosed by a projectile guard or shield. To simplify the instant disclosure, the lower end of the vehicle engine compartment 100 will be described as being bounded at a front end by a lower part 106 of the forward surface 108, and at a rear end by an air dam 109 which projects downwardly from a lower bulkhead 111 to project from the vehicle engine compartment 100. It is however to be appreciated that the lower part 106 or a projective guard or shield (or any other type of member) may extend along and partially or fully enclose the lower end of the vehicle engine compartment 100. It is also to be appreciated that the vehicle engine compartment 100 may be configured in any manner, and the members cooperating to define the substantially enclosed area of the vehicle engine compartment 100 may take any form while remaining within the scope of the present application.

A vehicle engine 114 is mounted and housed within the vehicle engine compartment 100. A vehicle radiator 116 is also mounted and housed within the vehicle engine compartment 100 at a position forward of the vehicle engine 114. Other vehicle components may also be mounted in the vicinity of the vehicle radiator 116, e.g., a condenser (not shown) may be provided at a position forward of the vehicle radiator 116. A vehicle bumper beam 118 is provided at the forward end of the vehicle engine compartment 100 in the vicinity of the forward surface 108. As illustrated, the vehicle bumper beam 118 is held entirely within the vehicle engine compartment 100. It is to be appreciated that the vehicle bumper beam 118 may alternatively protrude from the forward end of the vehicle engine compartment 100 or the forward surface 108 thereof, and/or be formed as part of the vehicle engine compartment forward surface 108 (e.g., integrated with a vehicle front fascia).

The operation and general structure of the vehicle engine 114 and radiator 116 are considered to be known in the art, and will therefore not be described in detail herein. It is noted that, during operation, the vehicle engine 114 may become heated, and the vehicle radiator 116 may operate to cool the vehicle engine 114. The airflow introducing and directing system 102 is described herein as being provided to facilitate the cooling operation of the vehicle radiator 116, though it is to be appreciated that the airflow introducing and directing system 102 may be provided to facilitate cooling of other vehicle components (e.g., the vehicle engine, vehicle brakes, etc.). The airflow introducing and directing system 102 includes airflow introducing ports 120 formed to introduce a ram airflow into the vehicle engine compartment 100, as well as an airflow directing member 122 for directing the airflow introduced into the vehicle engine compartment 100 to the vehicle radiator 116 (or other desired vehicle components, as the case may be).

The airflow introducing ports 120 may include openings defined through the surfaces 104, 108, 110, 112 bounding the vehicle engine compartment 100, as well as gaps or spaces between the surfaces 104, 108, 110, 112 (e.g., the opened area of the lower end of the vehicle engine compartment 100 may serve as airflow introducing ports 120). The airflow introducing ports 120 are formed to allow or encourage ram airflow to enter the vehicle engine compartment 100. As illustrated, the airflow introducing ports 120 include a bottom breather opening 124 and a front fascia opening 126.

The bottom breather opening 124 may be provided by the opened lower end of the vehicle engine compartment 100. Alternatively, for configurations wherein the lower end of the vehicle engine compartment 100 is bounded, the bottom breather opening 124 may be provided as opening formed through the structure bounding the lower end. For the purposes of this disclosure, the bottom breather opening 124 will be considered the opened lower end of the vehicle engine compartment 100 bounded at a front end by the lower part 106 of the forward surface 108 of the engine compartment, and at a rear end by the air dam 109. The bottom breather opening 124 may have a front end disposed at a position rearward from the vehicle engine compartment forward surface 108 and below the vehicle bumper beam 118, and a rear end relatively forward from the vehicle radiator 116 and engine 114.

The front fascia opening 126 is one or more openings defined through the vehicle engine compartment forward surface 108. The front fascia opening 126 may be provided by way of a vehicle front fascia or grille 128 formed on an outer face of the forward surface 108. The front fascia opening 126, as illustrated, may be formed at a position entirely above the vehicle bumper beam 118, and the vehicle grille 128 may also be provided to be entirely above the vehicle bumper beam 118.

As configured, a bottom breather airflow path 125 is defined within the vehicle engine compartment 100 as a path which bottom breather airflow introduced into the vehicle engine compartment 100 through the bottom breather opening 124 passes to reach the vehicle radiator 116. The bottom breather airflow path 125 may be a region of the vehicle engine compartment 100 bounded at a rearward end by the vehicle radiator 116, at a forward-upward end by a lower surface of the vehicle bumper beam 118, and at a forward end by the forward surface 108. The vehicle engine compartment 100 also defines a front airflow path 127 which is a path which front airflow introduced into the vehicle engine compartment 100 through the front fascia opening 126 passes to reach the vehicle radiator 116. The front airflow path 127 may be a region of the vehicle engine compartment 100 bounded at a rearward end by the vehicle radiator 116 and at an upward end by the upper surface 104.

Figure 3:
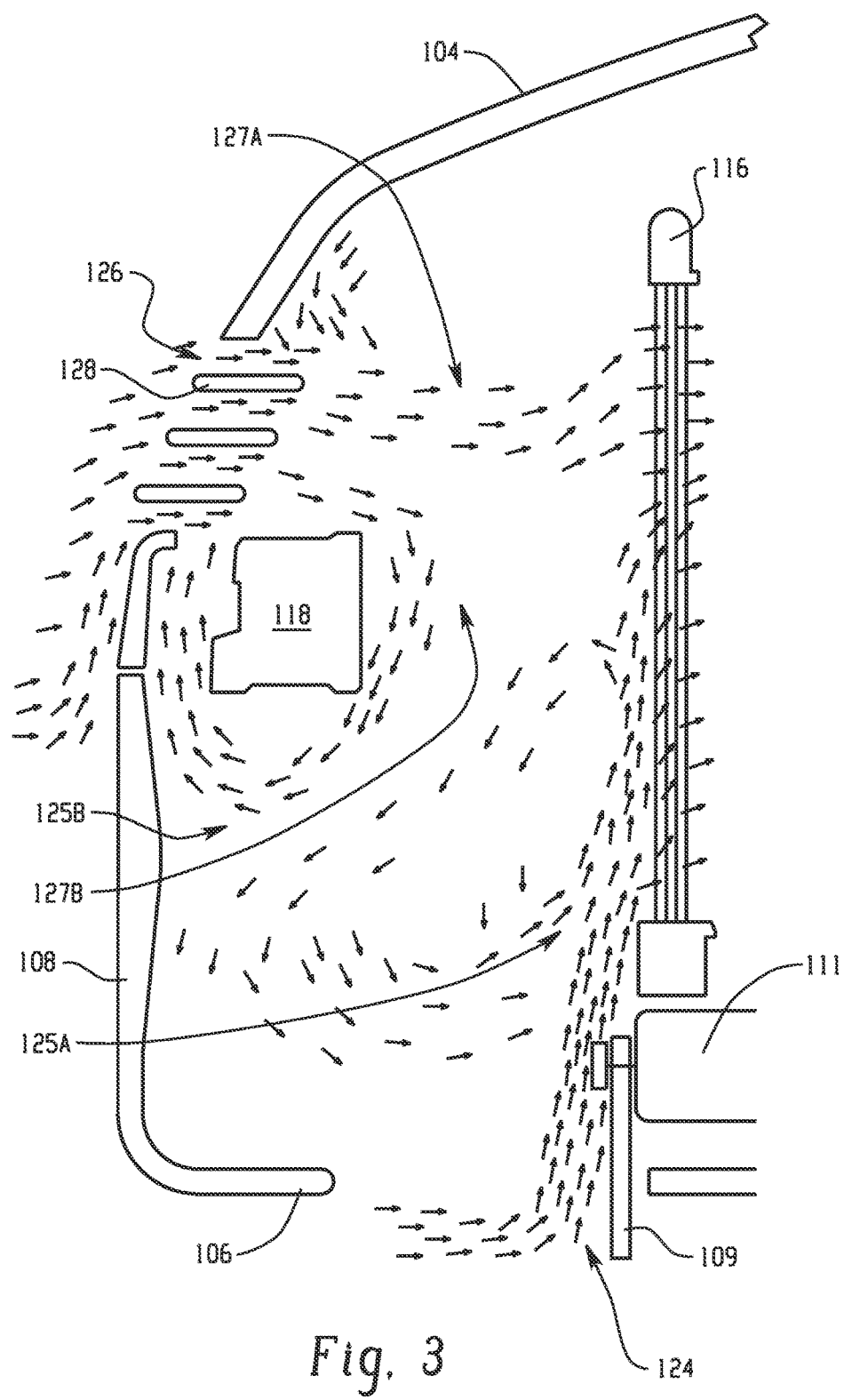
FIG. 3 is a side-sectional view of a computer simulated airflow within the vehicle engine compartment without the airflow directing member.

While bottom breather airflow reaches the vehicle radiator 116 via the bottom breather airflow path 125 and front airflow reaches the vehicle radiator 116 via the front airflow path 127, it is noted that certain portions of the vehicle engine compartment 100 may be susceptible to becoming low pressure areas or regions, which may degrade the cooling performance of the airflows. In this regard, FIG. 3 shows airflow patterns into the vehicle engine compartment 100 through the bottom breather opening 124 and the front fascia opening 126 in a configuration in which an airflow directing member 122 is not provided. With respect thereto, it is noted that a bottom high-pressure region 125A forms in the bottom breather airflow path 125, and a front high-pressure region 127A forms in the front airflow path 127. Furthermore, a lower low-pressure region 125B forms at a position disposed below the vehicle bumper beam 118, and a middle low-pressure region 127B forms at a position disposed immediately rearward of the vehicle bumper beam 118, between the vehicle bumper beam 118 and the vehicle radiator 116.

The lower and middle low-pressure regions 125B, 127B may degrade the ram airflow introduced through the bottom breather opening 124 and the front fascia opening 126, and thereby degrade the cooling performance thereof. Specifically, bottom breather and front airflows within the high-pressure regions 125A, 127A may be drawn to the low-pressure regions 125B, 127B, thereby degrading the volume and cooling performance of the ram airflows reaching the vehicle radiator 116. Furthermore, the bottom breather and front airflows may recirculate to the low-pressure regions 125A, 127A, thereby further degrading the volume and cooling performance of the ram airflows.

Figure 4:
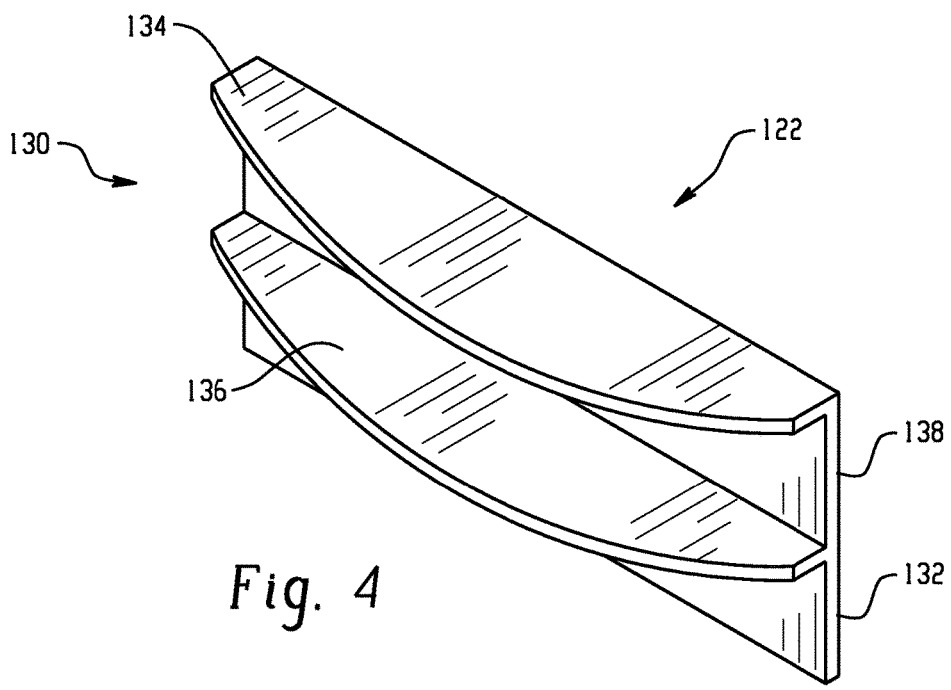
FIG. 4 is a front-perspective view illustrating the airflow directing member illustrated in FIG. 1.

The airflow directing member 122, illustrated in isolation in FIG. 4, is an exemplary member provided to reduce the occurrence and/or size of the low-pressure regions 125B, 127B so as to improve the cooling performance of the ram airflows. The airflow directing member 122 may be formed of plastic or any other suitable material, and may be provided as an integrally formed unitary piece or a collection of pieces which are secured to one another. As illustrated, the airflow directing member 122 includes a base portion 130 and a bottom breather airflow directing portion 132. Generally, the base portion 130 is configured to be secured (at a forward end thereof) to the vehicle bumper beam 118 and to extend in a rearward direction therefrom, so as to be positioned between the vehicle bumper beam 118 and the vehicle radiator 116. The bottom breather airflow directing portion 132 extends from the base portion 130 toward the bottom breather opening 124 so as to narrow the bottom breather airflow path 125.

It is noted that the vehicle bumper beam 118 may be formed in a curved shape across the vehicle engine compartment 100. Particularly, outer ends of the vehicle bumper beam 118 may be disposed in a rearward direction relative to a central portion. Accordingly, the airflow directing member 122, and particularly a front edge of the base portion 130, may be formed to have a similarly curved front edge.

The base portion 130 may be formed of an upper plate 134, a lower plate 136, and a rearward plate section 138. The upper plate 134 may be a substantially planar member having a forward end configured to be secured to an upper surface of the vehicle bumper beam 118. Similarly, the lower plate 136 may be a substantially planar member having a forward end configured to be secured to a lower surface of the vehicle bumper beam. The rearward plate section 138 may be a substantially planar member which extends between a rearward end of the upper plate 134 and a rearward end of the lower plate 136 so as to be spaced from the vehicle bumper beam 118 when the airflow directing member 122 is secured to the vehicle bumper beam 118. The base portion upper plate 134, lower plate 136, and rearward plate section 138 cooperate with a vehicle bumper beam rearward facing surface 140 to define a substantially enclosed space disposed immediately rearward from the vehicle bumper beam 118. The space occupied/enclosed by the base portion 130 substantially corresponds to and/or includes the middle low-pressure region 127B.

As illustrated, the base portion upper plate 134 and the base portion lower plate 136 may be substantially parallel to one another. A distance between the base portion upper plate 134 and lower plate 136 may be set to substantially equal or slightly exceed a height dimension of the vehicle bumper beam 118 (a direction between the upper surface 104 and lower surface 106). Furthermore, the width (in the left-right direction between left side surface 110 and right side surface 112) of the airflow directing member 122 (e.g., the base portion upper plate 134 and lower plate 136) may be substantially equal to a width of the vehicle bumper beam 118, a width of the vehicle engine compartment 118, or a width between opposing width-wise edges of bottom breather opening 124 and/or the front fascia opening 126. It is to be appreciated that any of the above may be modified while remaining within the scope of this disclosure. Particularly, the upper and lower plates 134, 136 need not be parallel to one another, and the distance between the upper and lower plates 134, 136, as well as the width of the airflow directing member 122 may be modified as desired. Further still, the forward ends of the upper and lower plates 134, 136 may be configured to be secured to the vehicle bumper beam 118 via any suitable known means, such as using an adhesive or mechanical fasteners, or to portions of the vehicle bumper beam 118 other than the upper and lower surfaces thereof.

The bottom breather airflow directing portion 132 may be a plate or plate-like member which extends from the airflow directing member base portion 130 so as to be aligned with the base portion rearward plate section 138. The bottom breather airflow directing portion 132 extends in a downward direction, as shown in FIG. 1, from the airflow directing member base portion 130 toward the bottom breather opening 124. It is noted that the bottom breather directing portion 132 and the rearward plate section 138 may be formed as a substantially continuous planar member, with the bottom breather airflow directing portion 132 being the portion of the substantially continuous planar member disposed at a lower position relative to the lower plate 136.

The bottom breather airflow directing portion 132 extends downwardly from the base portion 130 to a position where the bottom breather airflow directing portion 132 narrows the bottom breather airflow 125 path. Particularly, the bottom breather airflow directing portion 132 narrows the bottom breather airflow path 125 by substantially (or partially) blocking off a portion of the vehicle engine compartment 100 disposed forward of the bottom breather airflow directing portion 132 and downward from the vehicle bumper beam 118 from the bottom breather airflow path 125. In doing so, the bottom breather airflow directing portion 132 narrows the bottom breather airflow path 125 and cuts-off a portion of the lower low-pressure region 125B from the bottom breather airflow path 125.

By narrowing the bottom breather airflow path 125, the airflow pressure within the bottom breather airflow path 125 may increase. Furthermore, the bottom breather airflow directing portion 132 is positioned to prevent or reduce bottom breather airflow recirculation to a position underneath the vehicle bumper beam 118. As such, the lower low-pressure region 125B is substantially removed from, or has its size reduced within, the bottom breather airflow path 125.

With further respect to the airflow directing member 122, it is again noted that the base portion 130 is secured to the vehicle bumper beam 118 so as to extend in a rearward direction therefrom into the vehicle engine compartment 100 toward the radiator 116. As, such the base portion 130 (e.g., the space enclosed by the upper plate 134, lower plate 136, rearward plate section 138, and vehicle bumper beam rearward facing surface 140) is disposed immediately rearward of the vehicle bumper beam 118 and between the vehicle bumper beam 118 and the vehicle radiator 116. Accordingly, the base portion 130 occupies some or all of the space where the middle low-pressure region 127B would be formed, and thereby prevents the formation or reduces the size of the low-pressure region 127B.

With respect to the front airflow entering through the front fascia opening 126, it is noted that the front fascia opening 126 is positioned such that a lower or downward end thereof is substantially or generally vertically aligned with an upper surface of the base portion upper plate 134. As the upper plate 134 extends in a substantially rearward and generally horizontal direction from the vehicle bumper beam 118, as shown in FIG. 1, the base portion upper plate 134 is positioned to direct a front airflow entering the vehicle engine compartment 100 through the front fascia opening 128 to the vehicle radiator 116. In this regard, it will be appreciated that the positioning of the base portion upper plate 134 will prevent (or reduce) the front airflow from travelling in a downward direction toward the middle low-pressure region 127B upon entry of the vehicle engine compartment 100 through the front fascia opening 128.

Figure 5:
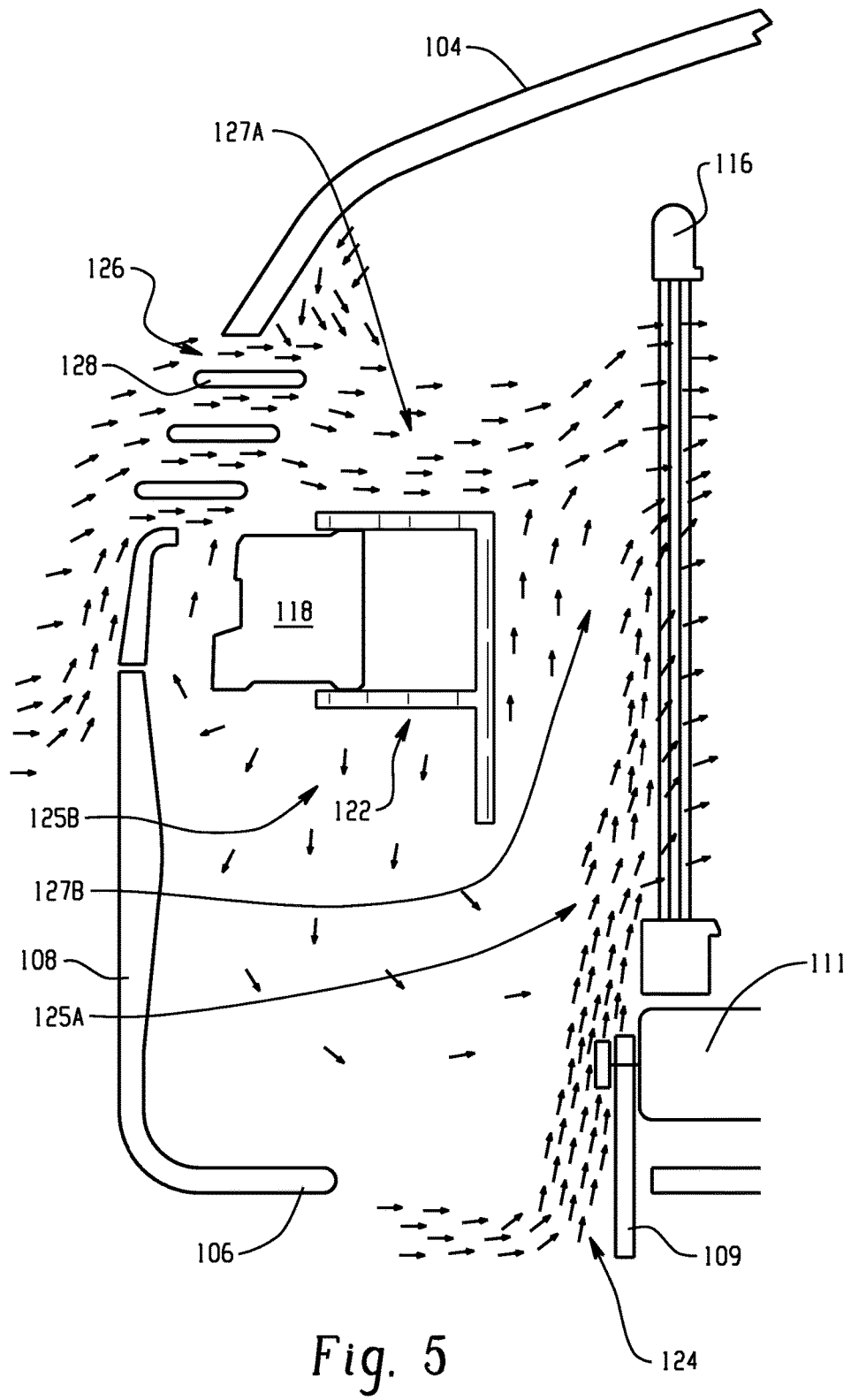
FIG. 5 is a side-sectional view of a computer simulated airflow within the vehicle engine compartment with the airflow directing member illustrated in FIG. 1.

FIG. 5 shows the movement of airflow within the vehicle engine compartment 100 with the airflow directing member 122 installed. Therein, it is shown that the lower and middle low-pressure regions 125B, 127B present within the bottom breather and front airflow paths are substantially eliminated and/or significantly reduced in size. It is noted that inasmuch as low-pressure regions may still exist, the airflow directing member 122 obstructs and thereby substantially prevents recirculation of the airflow to these regions, and substantially or partially isolates the high-pressure regions, 125B, 127B from the low-pressure regions 125A, 127A. In other words, the airflow directing member 122 substantially removes the low-pressure regions from the bottom breather and front airflow paths 125, 127. Furthermore, the size and volume of the bottom high-pressure region 125A and the front high-pressure region 127A are increased. Accordingly, the airflow directing member 122 allows/encourages a greater volume of airflow to reach the vehicle radiator 116, while reducing/eliminating recirculation of the ram airflow, thereby improving the cooling performance as compared with a configuration where the airflow directing member 122 is not provided.

It is noted that by mounting the airflow directing member 122 on the vehicle bumper beam 118 (e.g., directly to the bumper beam 118), the airflow directing member 122 may occupy the space disposed immediately rearward of the vehicle bumper beam 118, which may be a location of a low-pressure region (e.g., middle low-pressure region 127B) that detracts from ram airflow cooling performance. In this regard, it is also noted that the area between the vehicle bumper beam 118 or forward surface 108 and the vehicle radiator 116 may not include any structural members on which an airflow directing member may be secured. Alternatively, this area may already have vehicle operational components installed which may make the mounting of an airflow directing member in an appropriate location on a different vehicular structural member (e.g., other than the vehicle bumper beam 118) difficult.

Consequently, the herein disclosed airflow directing member 122 allows for the space immediately rearward of the vehicle bumper beam 118 (between the vehicle bumper beam 118 and the vehicle radiator 116) to be occupied without needing to provide additional or alternative vehicle structure to support the mounting of the airflow directing member 122. Further, the airflow directing member 122 may be integrally formed as a unitary piece, or pre-constructed, so as to be easily installed on (e.g., secured to) the vehicle bumper 118 during assembly. Further to this point, by providing the bottom breather airflow directing portion 132 with the airflow directing member 122, a single airflow directing member may be installed to direct airflow from both the front fascia opening 126 and the bottom breather opening 124. Additionally, by providing the bottom breather airflow directing portion 132 with the base portion 130 mounted to the vehicle bumper beam 118, the bottom breather airflow directing portion 132 does not need to be installed at a lower portion of the vehicle engine compartment 100, such as the lower surface 106. This further simplifies assembly of the vehicle, as the assembly personnel does not need to reach the lower portion of the vehicle engine compartment 100 to install an airflow directing member which directs bottom breather airflow.

Figure 6:
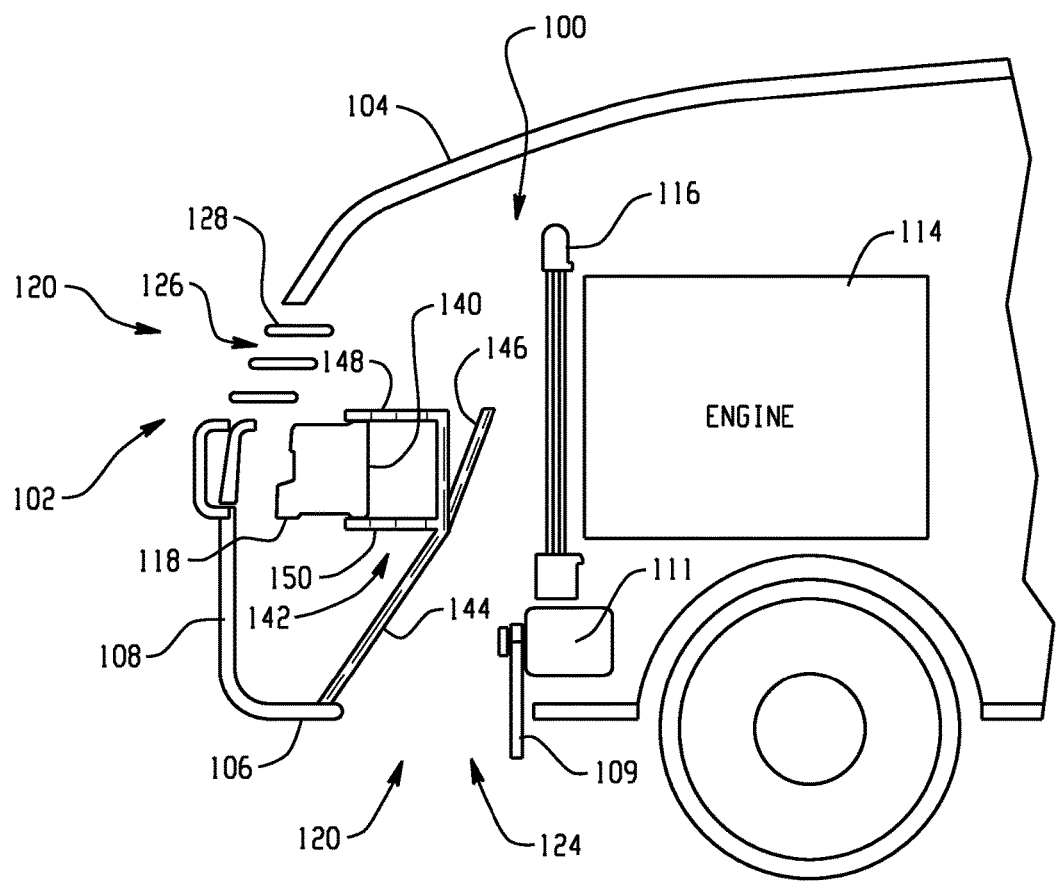
FIG. 6 is a side-sectional view of the vehicle engine compartment having the airflow directing member with an elongated bottom breather airflow directing portion.

The airflow directing member 122 may be alternatively configured to improve or further modify the airflow direction within the vehicle engine compartment. With reference to FIG. 6, an airflow directing member 142 having an elongated bottom breather airflow directing portion 144 and a bottom breather airflow reshaping portion 146 is shown. The airflow directing member 142 includes a base portion 148 which is similar to the base portion 130 of the airflow directing member 122 (shown in FIGS. 1 and 2). The elongated bottom breather airflow directing portion 144 extends from a rearward end of the base portion 148 and contacts a forward end of the bottom breather opening 124. The bottom breather airflow reshaping portion 146 has a root connecting to the base portion 148 which is generally vertically aligned with a lower plate 150 of the airflow directing member base portion 148. The bottom breather airflow reshaping portion 146 extends at an angle from the base portion 148 toward the vehicle radiator 116. It is to be appreciated that the bottom breather airflow reshaping portion 146 may alternatively have a curved or otherwise modified shape.

By this configuration, the extended bottom breather airflow directing portion 144 substantially blocks an entirety of a recirculation path to the position disposed underneath the vehicle bumper beam 118. As such, bottom breather airflow entering the vehicle engine compartment 100 may be entirely prevented from recirculating to the position underneath the vehicle bumper beam 118. Furthermore, the bottom breather airflow reshaping portion 146 may be configured to more precisely direct the bottom breather airflow to the vehicle radiator 116, or to particular parts of the vehicle radiator.

FIGS. 7-10 illustrate a further variation of the herein described airflow directing member. Particularly, in a vehicle engine compartment 100 similar to that of FIG. 1, an airflow directing member 152 may be secured to a pair of vertically-oriented support rods 154 provided between the vehicle radiator 116 and the vehicle bumper beam 118. As shown, the support rods 154 are rod-like members which are secured to the lower bulkhead 111 and extend upwardly therefrom toward the upper surface 104. The support rods 154 are spaced from one another such that each is generally adjacent to one of the first and second side surface 110, 112 of the vehicle engine compartment 100. The support rods 154 may be disposed laterally inwardly from outer lateral edges of the vehicle radiator 116. The support rods 154 may be provided to support other vehicle components, may be structural support members for the vehicle or vehicle engine compartment 100, or may be specially provided to support the airflow directing member 152.

The airflow directing member 152 is generally T-shaped, having a base portion 156 and a bottom breather airflow directing portion 158 projecting therefrom. Connectors 160 are provided at a rearward end of the base portion 156 on an upper surface of the base portion 156 for connecting the airflow directing member 152 to the pair of support rods 154. The connectors 160 may be provided with a fixing mechanism (not shown) to connect the airflow directing member 152 to the pair of support rods 154 at a fixed position. The fixing mechanisms may take the form of any mechanism suitable for fixing the airflow directing member 152 to the support rods 154 via the connectors 160, such as a screw and/or nut and bolt assembly. Alternatively, the connectors 160, and therefore the airflow directing member 152, may be integrally formed with the support rods 154.

Figure 7:
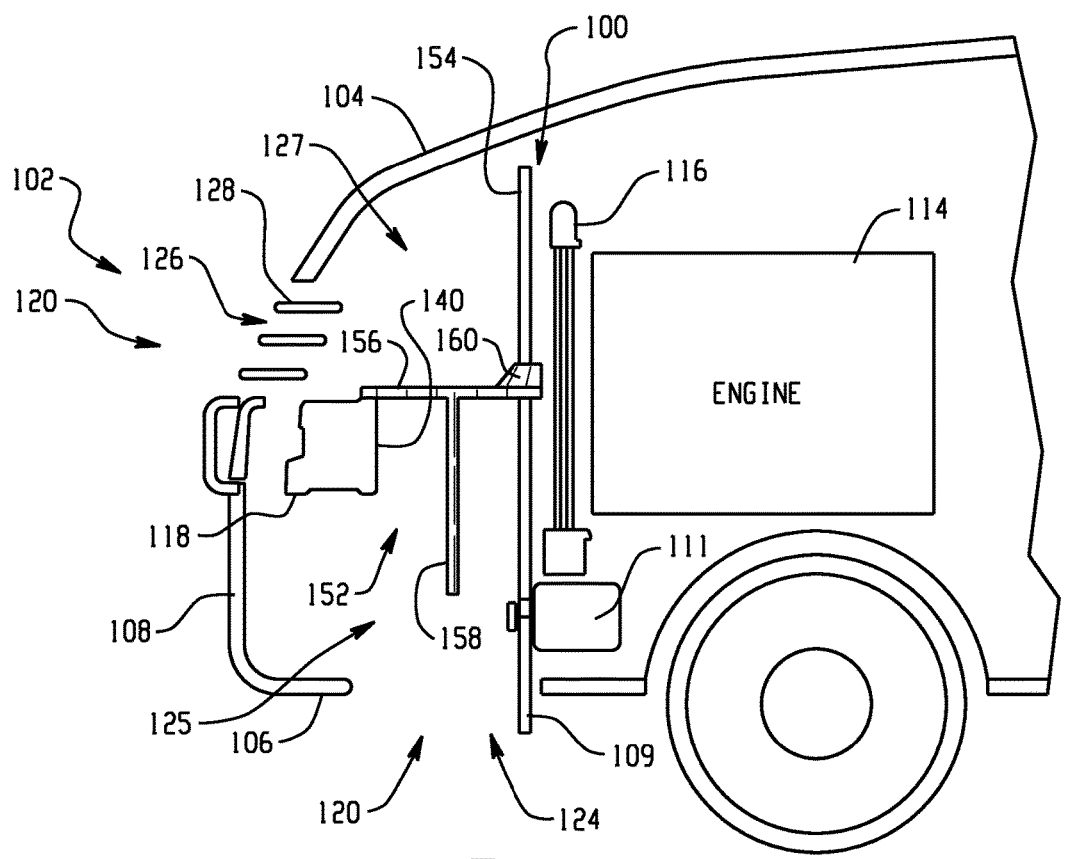
FIG. 7 is a side-sectional view of the vehicle engine compartment having an airflow directing member secured to support rods.
Figure 9:
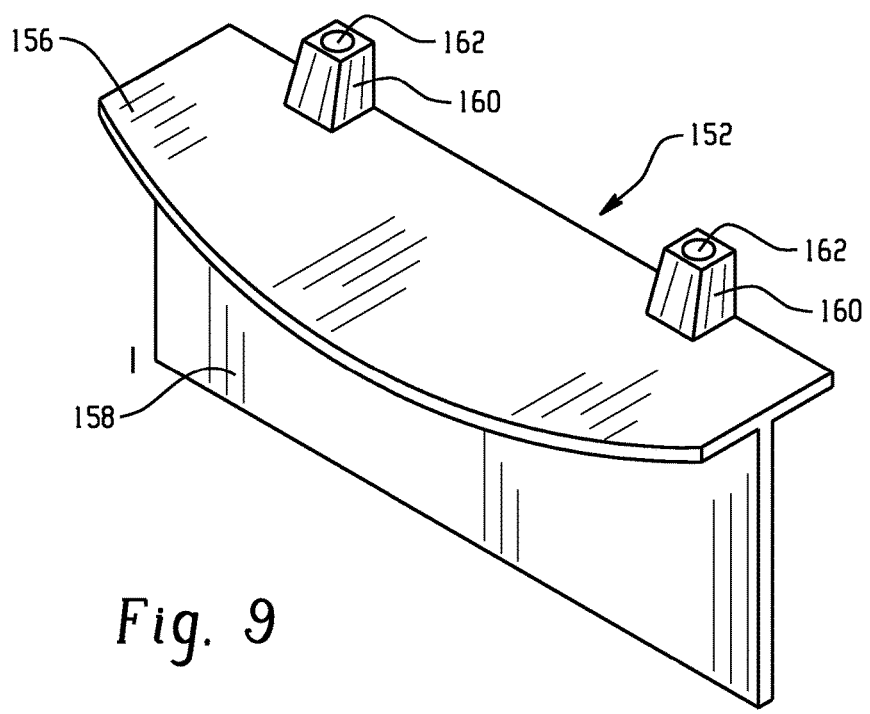
FIG. 9 is a front-perspective view illustrating the airflow directing member illustrated in FIG. 7.
Figure 8:
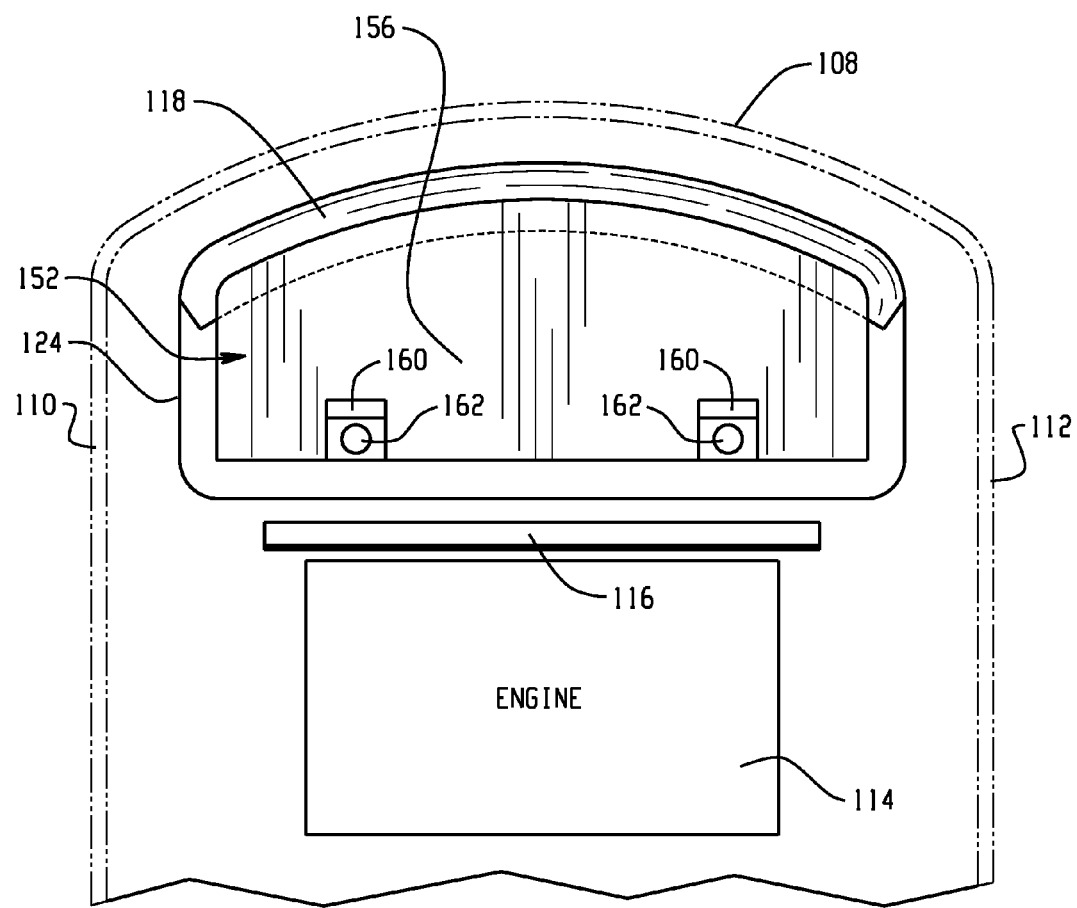
FIG. 8 is a plan view of the vehicle engine compartment having the airflow directing member illustrated in FIG. 7.

With particular respect to the airflow directing member 152, the base portion 156 is a substantially planar, plate member having a forward end which may be curved so as to cooperate with a similarly curved vehicle bumper beam 118. The bottom breather airflow directing portion 158 is also a substantially planar, plate member which projects downwardly from a lower surface of the base portion 156. As shown in FIG. 7, the base portion 156 and bottom breather airflow directing portion 158 cooperate to form a shape resembling a "T". However, the bottom breather airflow directing portion 158 may not intersect with the base portion 156 at a longitudinal center, e.g., as illustrated the bottom breather airflow directing portion 158 intersects with the base portion 156 at a position nearer to the rear edge than the front edge.

The base portion 156 may have a width, in a lateral direction of the vehicle engine compartment 100, which is greater than space between the supporting rods 154. The width of the base portion 156 may be substantially equal to or greater than that of the vehicle radiator 116, the vehicle bumper beam 118, the bottom breather opening 124, and/or the front fascia opening 126. A length of the base portion 156 in a longitudinal direction (front-to-rear of vehicle engine compartment 100) may be substantially equal to greater than a distance from the vehicle bumper beam rearward facing surface 140 to the support rods 154. The bottom breather airflow directing portion 158 may have a width equal to that of the base portion 156, and may have a height (in a vertical direction of the vehicle engine compartment 100) which is greater than that of the vehicle bumper beam 118, and sufficiently long so as to interact with and direct bottom breather airflow.

The connectors 160 are provided as bodies projecting upward from the upper surface of the base portion 156. The connectors 160 each have a support rod receiving opening 162 defined therethrough. Furthermore, a corresponding opening aligned and communicating with the rod support is defined through the base portion 156. Each support rod receiving opening 162 is sized and shaped to substantially correspond with the support rods 154 such that each of the support rods 154 may be received in and pass through one of the support rod receiving openings 162. In this regard, the connectors 160 are positioned on the upper surface of the base portion 156 such that each of the connectors 160 may engage or connect to one of the support rods 154. As noted above, the connectors 160 may be provided with fixing mechanisms so as to engage or connect to the support rods 154 at a fixed position such that the airflow directing member 152 is fixed relative to the support rods 154 and the vehicle engine compartment 100. It is to be appreciated that the herein described connectors 160 are merely exemplary, and the airflow directing member 152 may be secured or connected to the support rods 154 in any suitable manner.

As shown in FIG. 7, the airflow directing member 152 is secured to the support rods 154 by having each support rod 154 pass through one support rod receiving openings 162 defined through one connector 160. The airflow directing member 152 may then be locked into a desired vertical position using any type of fixing mechanism, such as a screw or bolt assembly. The desired vertical position of the airflow directing member 152 may be such that a lower surface of the base portion 156 abuts or is disposed over an upper surface of the vehicle bumper beam 118. This position may also be vertically aligned with the lowermost front fascia opening 126. In this regard, the airflow directing member 152 may optionally also be secured at the front edge of the base portion 156 to the vehicle bumper beam 118 in a similar manner as the upper and lower plates 134, 136 of the airflow directing member 122 are secured to the vehicle bumper beam 118.

Figure 10:
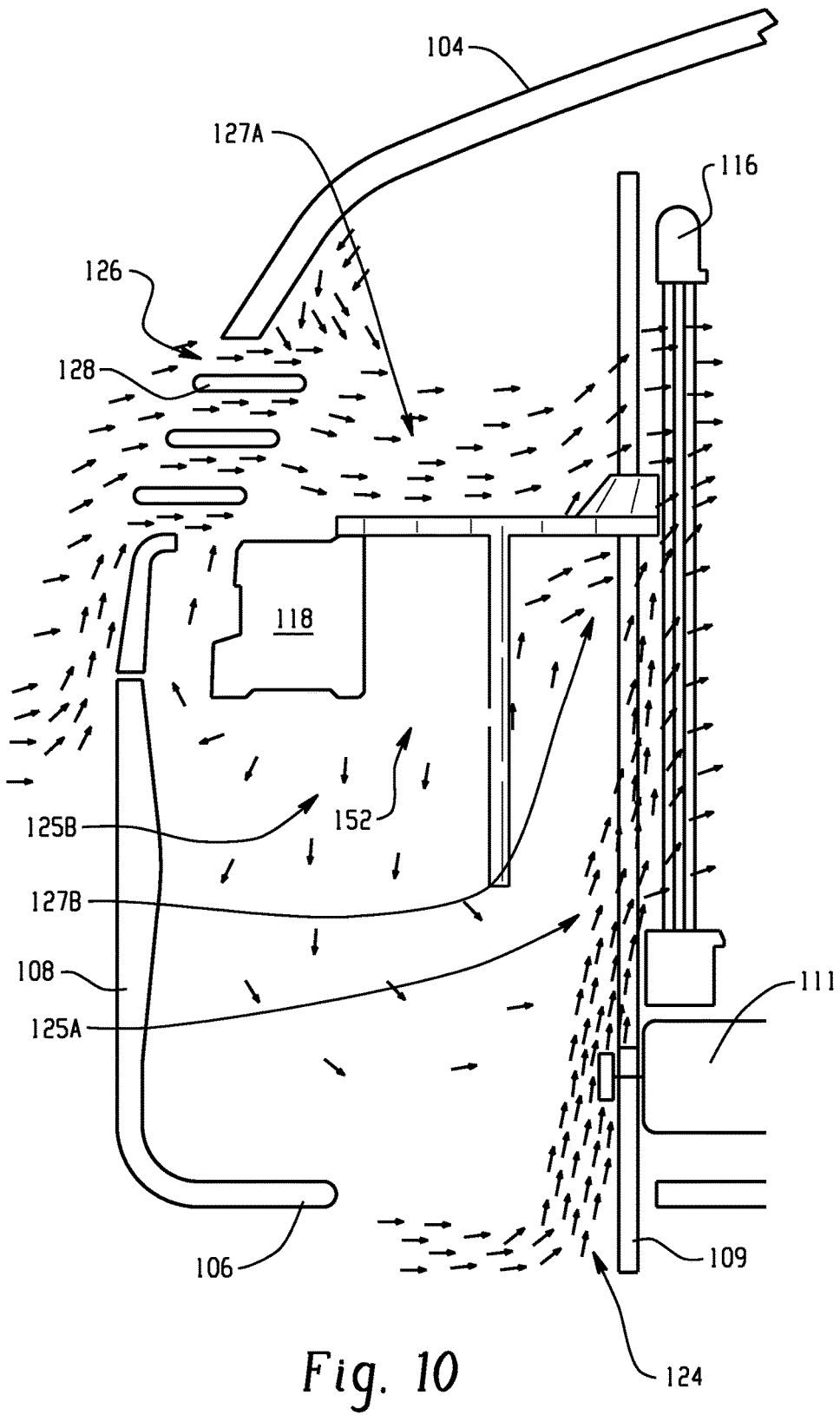
FIG. 10 is a side-sectional view of a computer simulated airflow within the vehicle engine compartment with the airflow directing member illustrated in FIG. 7.

The airflow directing member 152 directs the ram airflow in a manner similar to that of the above-described airflow directing member 122. Particularly, as shown in FIG. 10, the airflow directing member 152 reduces the size of lower and middle low-pressure regions 125B, 127B, and generally segregates these low-pressure regions 125B, 127B from the bottom breather and front airflow paths 125, 127. In this regard, the above description of the direction of the ram airflow, and particularly the above-description of FIG. 5, is incorporated herein by reference with respect to the airflow directing member 152 and the illustration of FIG. 10.

It is noted that the bottom breather airflow directing portion 158 narrows the bottom breather airflow path 125 in a similar manner to the above-described bottom breather airflow directing portion 132. To this point, the bottom breather airflow directing portion 158 also functions to prevent recirculation of bottom breather airflow to the area underneath the vehicle bumper beam 118. Furthermore, the bottom breather airflow directing portion 158 may be positioned in a longitudinal direction so as to optimize a space between a rear surface of the bottom breather airflow directing portion 158 and the vehicle radiator 116. This space between the bottom breather airflow directing portion 158 and the vehicle radiator 116 is part of the bottom breather airflow path 125 from the bottom breather opening 124 to the vehicle radiator 116.

The bottom breather airflow directing portion 158 may also be positioned to optimize a space between a front surface of the bottom breather airflow directing portion 158 and the vehicle bumper beam 118. This area may correspond to the middle low-pressure region 127B, and may be segregated or substantially segregated from a path of the ram airflow by the bottom breather airflow directing portion 158 and the base portion 156. In this way, the base portion 156 and the bottom breather airflow directing portion 158 still substantially enclose the space disposed immediately rearward of the vehicle bumper beam 118. The base portion 156 is also positioned to direct the front airflow from the front fascia opening 126. In this regard, by having the front edge of the base portion 156 disposed above the vehicle bumper beam 118, the front airflow may be prevented from traveling downward to the space between the bottom breather airflow directing portion 158 and the vehicle bumper beam 118.

It is reiterated that the airflow directing member 152 directs airflow in a manner similar to that of the above-described airflow directing member 122. By securing the airflow directing member 152 to the support rods 154, many of the same benefits associated with securing the above-described airflow directing member 122 to the vehicle bumper beam 118 are achieved. For example, as the support rods 154 may already be provided in the vehicle engine compartment 100 for other reasons, there is no need for any additional structure to be introduced for the airflow directing member 152 to be supported. Moreover, the benefits associated with easy installation are also realized by securing the airflow directing member 152 to the support rods 154. As an additional advantage over the above-described airflow directing member 122, by not securing the airflow directing member 152 to the vehicle bumper beam 118, the airflow directing member 152 is at less risk for damage in the event of a collision.

It is noted that the airflow directing member 152 shown in FIGS. 7-10 may be modified in a manner shown in FIG. 6. For example, the bottom breather airflow directing portion 158 may be extended. Additionally, a part of the base portion 156 disposed rearward from the bottom breather airflow directing portion 158 may have a curved shape.

It will be appreciated that various of the above-disclosed and other features and functions, or alternatives or varieties thereof, may be desirably combined into many other different systems or applications. For example, the positioning of any of the airflow introducing ports 120 may be modified, along with the structure of the airflow directing member 122 to facilitate direction of the airflows. Furthermore, the airflow introducing and directing system 102 may be alternatively configured to direct airflow to a vehicle component other than the vehicle radiator 116 without departing from the scope of the instant disclosure. It is also to be appreciated that various presently unforeseen or unanticipated alternatives, modifications, variations or improvements therein may be subsequently made by those skilled in the art which are also intended to be encompassed by the following claims.

What is claimed is:

1. A vehicle engine compartment having a vehicle bumper beam disposed at a forward end thereof, support rods disposed rearwardly from the vehicle bumper beam and secured to a lower bulkhead disposed rearwardly and below the vehicle bumper beam, and airflow introducing ports including a bottom breather opening for introducing a bottom breather airflow into a bottom breather airflow path in the vehicle engine compartment, the vehicle engine compartment comprising:
an airflow directing member having a base portion and a bottom breather airflow directing portion;
the base portion extending between the support rods and the vehicle bumper beam; and
the bottom breather airflow directing portion depending from the base portion and below the vehicle bumper beam such that the bottom breather airflow path within the vehicle engine compartment is narrowed by the bottom breather airflow directing portion when the base portion of the airflow directing member is secured to the support rods,
wherein the airflow directing member is directly secured to the support rods,
wherein the base portion has a length such that the forward end is disposed immediately above the vehicle bumper beam when the airflow directing member is secured to the support rods,
wherein the base portion and the bottom breather airflow directing portion are integrally formed to define a one-piece airflow directing member.

2. The vehicle engine compartment according to claim 1, wherein the support rods are at least one of: structural support members for the vehicle engine compartment and support members connected to and supporting vehicle components other than the airflow directing member.

3. The vehicle engine compartment according to claim 1, wherein the base portion and bottom breather airflow directing portion cooperate to enclose a space disposed within the vehicle engine compartment at a position immediately rearward of the vehicle bumper beam when the base portion is secured to the support rods.

4. The vehicle engine compartment according to claim 1, wherein the base portion has a forward end and a rearward end, and further includes at least one connector disposed at the rearward end, said connector configured to fixedly connect the airflow directing member to the support rods.

5. The vehicle engine compartment according to claim 4, wherein the base portion is a substantially planar plate member, and the bottom breather airflow directing portion is a substantially planar plate member which extends from a lower surface of the base portion at a position between the base portion forward end and the base portion rearward end.

6. The vehicle engine compartment according to claim 5, wherein the bottom breather airflow directing portion is disposed relatively nearer to the base portion rearward end than to the base portion forward end.

7. The vehicle engine compartment according to claim 1, wherein the base portion has a length, in a front-to-rear direction of the vehicle engine compartment, greater than a distance from a vehicle bumper beam rear facing surface to the support rods, and has a width, in a lateral direction of the vehicle engine compartment, greater than a space between the support rods, and
wherein the base portion and the bottom breather airflow directing portion define a T-shaped airflow directing member.

8. A vehicle engine compartment comprising:
a vehicle bumper beam disposed at a forward end of the vehicle engine compartment;
a vehicle radiator held therein at a position relatively rearward from the vehicle bumper beam;
support rods disposed between the vehicle bumper beam and the vehicle radiator, the support rods secured to a lower bulkhead
a bottom breather opening defined through a lower surface of the vehicle engine compartment, the bottom breather opening formed to allow a bottom breather airflow to be introduced into the vehicle engine compartment, a bottom breather airflow path defined from the bottom breather opening to the vehicle radiator; and
a T-shaped airflow directing member having a base portion and a bottom breather airflow directing portion integrally formed with the base portion, the airflow directing member directly secured to the support rods and the base portion extending between an upper surface of the vehicle bumper beam and the support rods, and the bottom breather airflow directing portion depending from the base portion below the vehicle bumper beam and toward the bottom breather opening to a position obstructing recirculation of bottom breather airflow disposed underneath the vehicle bumper beam, wherein the base portion has a width, in a lateral direction of the vehicle engine compartment, which is greater than a space between the support rods and the airflow directing member includes at least one connector having a connector body projecting from the airflow directing member and configured to fixedly secure the airflow directing member directly to the support rods.

9. The vehicle engine compartment according to claim 8, wherein the support rods are at least one of: structural support members for the vehicle engine compartment and support members connected to and supporting other vehicle components.

10. The vehicle engine compartment according to claim 8, wherein the base portion and bottom breather airflow directing portion cooperate to enclose a space disposed between the vehicle bumper beam and the vehicle radiator.

11. The vehicle engine compartment according to claim 8, wherein the base portion includes a forward end and a rearward end, and the at least one connector is provided at the rearward end of the base portion.

12. The vehicle engine compartment according to claim 11, wherein the forward end of the base portion is disposed immediately above the vehicle bumper beam.

13. The vehicle engine compartment according to claim 12, further comprising a front fascia opening defined through a forward surface defining the vehicle engine compartment at a position above the vehicle bumper beam, the front fascia opening formed to allow a front airflow to enter the vehicle engine compartment, wherein the base portion of the airflow directing member is positioned to direct the front airflow to the vehicle radiator.

14. The vehicle engine compartment according to claim 11, wherein the base portion is a substantially planar plate member, and the bottom breather airflow directing portion is a substantially planar plate member which extends from a lower surface of the base portion at a position between the base portion forward end and the base portion rearward end.

15. The vehicle engine compartment according to claim 14, wherein bottom breather airflow directing portion is disposed relatively nearer to the base portion rearward end than to the base portion forward end.

16. The vehicle engine compartment according to claim 8, further comprising a front fascia opening defined through a forward surface defining the vehicle engine compartment at a position above the vehicle bumper beam, the front fascia opening formed to allow a front airflow to enter the vehicle engine compartment, wherein the base portion of the airflow directing member is positioned to direct the front airflow to the vehicle radiator.

* * * * *